May 17, 1955  H. S. RAINBOW ET AL  2,708,340
GAS CONTROL IN AFTERBURNER

Filed Nov. 24, 1950  2 Sheets-Sheet 1

INVENTORS
**H. S. RAINBOW
+ R. F. W. GUEST**
By
Mawhinney + Mawhinney
ATTYS.

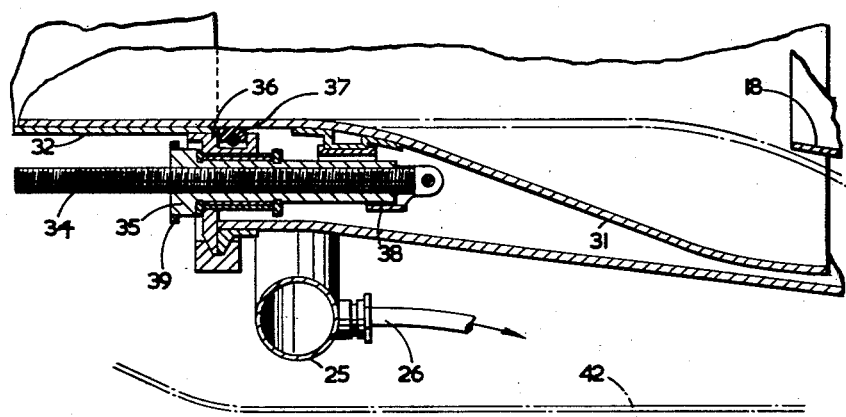
FIG.5
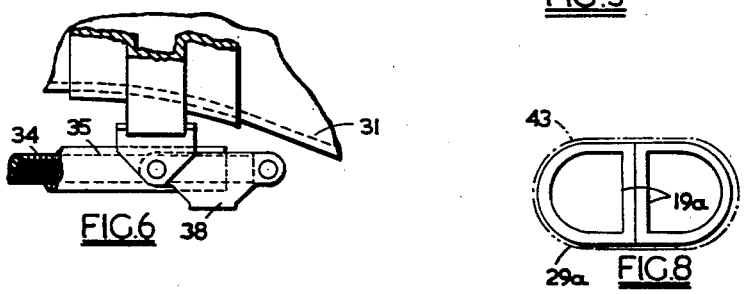
FIG.6
FIG.8
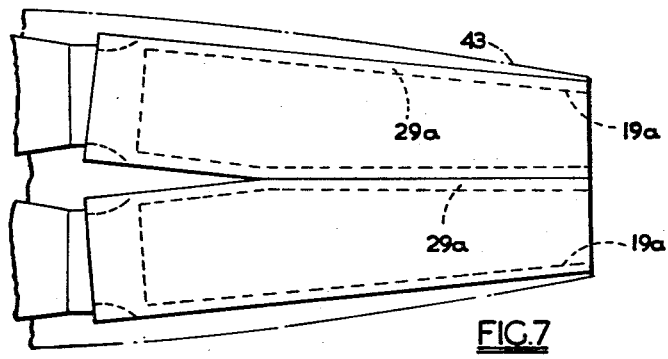
FIG.7

United States Patent Office 2,708,340
Patented May 17, 1955

2,708,340

GAS CONTROL IN AFTERBURNER

Horace S. Rainbow and Ronald F. W. Guest, Coventry, England, assignors to Armstrong Siddeley Motors Limited, Coventry, England Application November 24, 1950, Serial No. 197,254

Claims priority, application Great Britain December 31, 1949

5 Claims. (Cl. 60—35.6)

This invention relates to an "after-burning" or re-heat system for the exhaust gases of a turbojet engine.

The exhaust gases of an ordinary turbojet engine which is not adapted for its exhaust gases to be re-heated, pass through an exhaust diffuser, a jet pipe and a jet nozzle which are designed to reduce losses to a minimum and to provide optimum conditions for jet propulsion. Such a diffuser, jet pipe or jet nozzle are herein referred to, for convenience, as being "of normal dimensions."

When a turbojet engine is at times to have its exhaust gases re-heated, the usual practice is to use a longer exhaust diffuser and a jet pipe of larger diameter than ones "of normal dimensions" with a view to reducing the axial velocity of the mass flow in the jet pipe (near the inlet end of which the re-heat fuel is supplied) to a value such as will enable combustion of the re-heat fuel to be sustained and completed within the length of the jet pipe. The jet nozzle itself is adjustable so that it can be opened to an extent sufficient to pass the greater mass of the gases in re-heat conditions, and reduced in size as necessary in non re-heat conditions.

The use of such a diffuser, jet pipe and adjustable nozzle, when operating without re-heat, involves a loss of, say, about 3% over the use of a diffuser, jet pipe and jet nozzle "of normal dimensions." It is, moreover, a difficult matter properly to cool the adjustable jet nozzle, particularly in conditions of re-heat. Furthermore, the mechanical means for adjusting the jet nozzle are very liable to distortion. In addition, cooling of the jet pipe has hitherto also presented difficulties owing to the high gas temperatures during re-heating, one of the major problems being the adequate thermal insulation of the jet pipe (during reheating) to avoid damage to any airframe in which the engine is installed.

The main object of the invention is to provide an improved re-heat system by which the above-mentioned disadvantages are avoided.

The present invention consists in a turbojet engine having an exhaust diffuser, a jet nozzle and a jet pipe (to which latter re-heat fuel may be supplied in a usual manner) all of which are "of normal dimensions," and combined therewith is an annular passage, terminating with a jet nozzle, round the jet pipe and its associated jet nozzle, whilst a controllable means is provided for diverting (in conditions of re-heat) a sufficient portion of the exhaust gases to the annular passage from the jet pipe in order to sustain and ensure the completion of combustion of the re-heat fuel within the length of the jet pipe, and to provide a combined jet nozzle area which is sufficient for the total mass flow. In conditions of re-heat the proportion of gas diverted from the jet pipe will be controlled by the area of the annular jet nozzle at the end of the annular passage.

In the accompanying drawings:

Figure 5 is a fragmentary sectional elevation, to a much larger scale, showing part of the operating means for the control sleeve, the latter being shown in full lines in the position it occupies during re-heating;

Figure 6 is a fragmentary elevation showing the connection between the operating screw of Figure 5 and the control sleeve;

Figure 7 is a line diagram (in plan) of the exhaust diffusers, jet pipes and jet nozzles of twin jet turboengines arranged beside one another and adapted according to the invention; and Figure 8 is a line diagram taken from the right of Figure 7.

Figure 1:
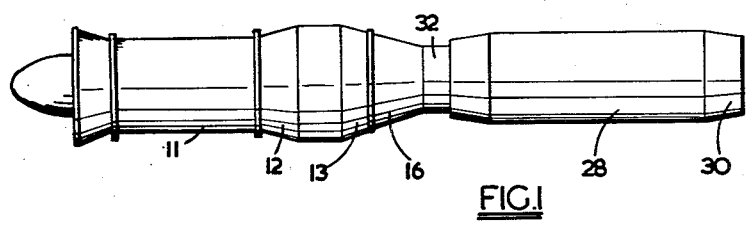
Figure 1 is an elevational view of a turbojet engine arranged according to the invention.

Figure 1 shows an axial-flow compressor 11, a combustion chamber means 12 in which air compressed by the compressor has heat added to it by the burning of fuel therein, and a turbine 13 the rotor of which is driven by the products of combustion issuing from the combustion chamber means and which drives the rotor of the compressor, all in a known manner. The exhaust gases from the turbine pass into a diffuser 15 (Figures 2 and 3) comprising an outer convergent wall 16 and an inner exhaust cone 17. The outlet or downstream end of the diffuser communicates with a jet pipe 18 terminating with a jet nozzle 19. As stated, the exhaust diffuser 15, the jet pipe 18 and the jet nozzle 19 are all "of normal dimensions."

Figure 4:
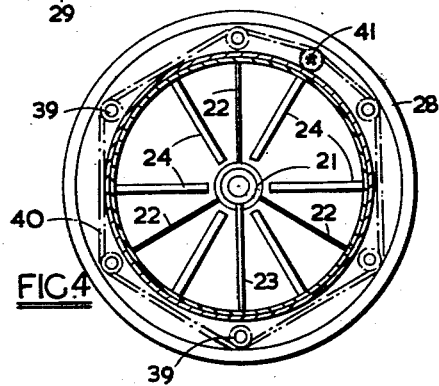
Figure 4 is an actual cross-section, but to a larger scale, taken on the line 4—4 of Figure 3, the view showing, in particular, one means for supplying re-heat fuel and part of an operating means for the control sleeve.

The manner in which re-heat fuel is supplied to the inlet end of the jet pipe 18 forms no part of the present invention. The drawings show an igniter in the form of a hollow cone 21, supported (Figure 4) by struts 22, to the interior of which is delivered along a pipe 23 a pilot supply of fuel to be ignited in any convenient manner. The main supply of re-heat fuel can be delivered from the trailing edges of radially-extending pipes 24. (This is as disclosed in application Ser. No. 186,251, now abandoned, corresponding to British patent specification No. 674,641.) Figure 5 shows an annular fuel pipe 25 from which fuel can be delivered to the pipes 23, 24 by means of pipes such as pipe 26.

Figure 2:
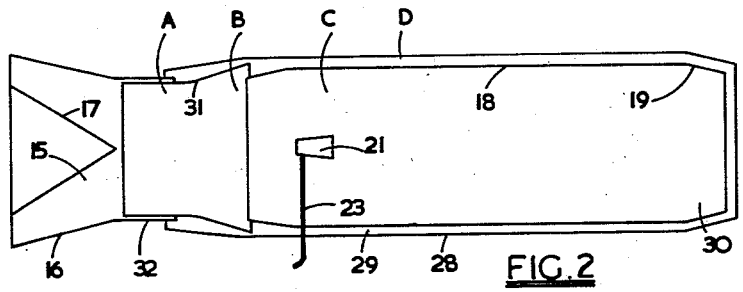
Figure 2 is a sectional elevation in diagrammatical form, to a larger scale, of the exhaust diffuser, jet pipe, jet nozzle and associated parts, with a control sleeve shown in the position it occupies during re-heating of the exhaust gases.
Figure 3:
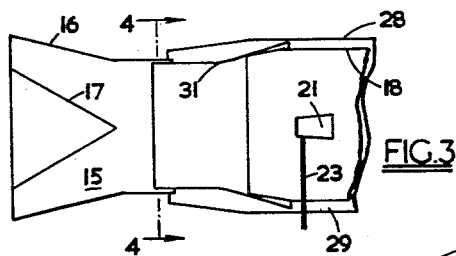
Figure 3 is a similar fragmentary view to that of Figure 2 but with the control sleeve shown in the position it occupies when re-heating is not taking place.

In accordance with the present invention, the jet pipe 18 is surrounded by a casing 28 spaced radially therefrom to provide an annular passage 29, the casing 28 terminating with a jet nozzle 30. Associated with the inlet end of the jet pipe 18 is a controllable member in the form of a sleeve 31 having a sliding, sealed engagement with a cylindrical casing 32 at the downstream end of the convergent casing 16. Figure 3 shows the upstream end of the annular passage 29 as being closed by the control sleeve 31 when, as stated, the exhaust gases are not to be re-heated, and ordinary optimum conditions are then available for the jet. When re-heat is to be applied, however, the sleeve is withdrawn to uncover the inlet end of the annular passage 29, as shown by Figure 2, and thus an appropriate part of the exhaust gases at the inlet end of the jet pipe 18 (which are at a relatively low temperature) can travel along the annular passage 29, thereby cooling the jet pipe along its length and insulating the outer wall 28 of the annular passage from the high temperature. In addition, the diverted gases serve also to provide a part of the propulsion thrust when issuing from the annular jet nozzle round the main jet nozzle 19.

In this way the re-heating can be effected in a satisfactory and efficient manner, and greater efficiency is obtained in conditions of no re-heat than with the previously known system.

Another advantage from this invention is that, when a pilot is landing with the engine idling, in many conditions the idling engine produces a substantial and unwanted thrust; but by uncovering the opening to the annular passage 29 (as is done when re-heat fuel is to be applied) the thrust of the engine can be reduced.

In a rather similar way, when starting up, the thrust reaction which results whilst the engine is being run up to idling speeds is not usually desirable, particularly in the case of a long jet pipe; and such thrust reaction can be reduced by uncovering the opening to the annular passage.

In one method of operating the control sleeve 31, the latter has attached to it (see Figures 5 and 6) a plurality of axially-extending screws 34 engaged with rotatable sleeve nuts 35 which are axially located in a carrier ring 36 secured round the outside of the outlet end of the cylindrical casing 32. An annular seal 37 carried by the carrier ring 36 engages the outer periphery of the control sleeve. The method of attaching each screw to the control is by means of a shackle 38. Each sleeve nut is integral with a sprocket wheel 39, and all the sprocket wheels are interconnected by means of an endless chain 40 (Figure 4) which, in addition, is engaged with a sprocket wheel driven by a reversible electric motor, as indicated at 41. Thus, operating the motor in one direction or the other will correspondingly slide the control sleeeve to cover or uncover the opening to the annular passage 29, the reaction of the screws being taken by the carrier ring. Obviously, many alternative arrangements can be made for operating the control sleeve.

A further important advantage of the invention is that the aircraft designer is enabled to fair the outer skin of the aircraft to the effective jet nozzle diameter without introducing any excessive drag such as results from the existing re-heat systems embodying a variable jet nozzle where the difference between the effective nozzle diameter and the clearance in the air-frame to accommodate the variable nozzle apparatus is necessarily large. Figure 5 indicates part of such a fairing by the chain lines 42.

This advantage is particularly important where very high forward speeds of the aircraft are envisaged and is even more apparent when two jet pipes, with re-heat systems according to the invention, are disposed close to one another, as shown by Figures 7 and 8, in which case the standard and annular nozzles of each can be substantially D-shaped with the straight sides of the D of the annular nozzles in contact. In Figures 7 and 8 the main jet nozzles are marked 19a, and the annular passages round the main jet pipes are marked 29a. A fairing 43 is indicated by chain lines.

It is preferable to design the parts to give certain advantageous gas speeds. Referring once more to Figure 2, a typical engine will provide a gas speed just downstream of the exhaust diffuser 15, i. e., at A, giving a Mach number of, say, 0.41. To minimize losses this speed is reduced by the divergent portion of the controllable sleeve 31 (in conditions of re-heat) to a speed, just upstream of the inlet end of the jet pipe 18, i. e., at B, giving a Mach number of about 0.245. The inlet end of the jet pipe is, it will be observed, slightly divergent further to reduce the speed, say, down to a Mach number of 0.2, before combustion of the re-heat fuel takes place, i. e., at C. On the other hand, the area of the annular passage 29 initially decreases slightly from its inlet end so as to speed up the mass flow to a Mach number of, say, 0.32 along the main length of the annular passage, e. g., at D. The ratio of the mass flow in the annular passage 29 to the mass flow in the jet pipe inlet may advantageously be about 1 to 1.62, i. e., about 0.617.

What we claim as our invention and desire to secure by Letters Patent of the United States is:

1. A turbojet engine having an exhaust diffuser, a jet pipe spaced downstream of said exhaust diffuser, a jet nozzle at a downstream end of said jet pipe, means for supplying re-heat fuel to said jet pipe, and a casing concentrically around said jet pipe, said casing and jet pipe defining an annular passage round said jet pipe and an annular jet nozzle round said jet nozzle, in combination with a second diffuser bridging the space between said exhaust diffuser and said jet pipe, said second diffuser having an upstream end sealingly engaged with a downstream end of said exhaust diffuser, said second diffuser having a flared downstream end round the upstream end of said jet pipe, and said second diffuser axially slidable between a position in which its flared downstream end engages said upstream end of said jet pipe when re-heat fuel is not being supplied to said jet pipe, whereby all the exhaust gas is caused to pass through said jet pipe and be delivered from said jet nozzle, and a position in which said flared downstream end is clear of said upstream end of said jet pipe during supply of re-heat fuel, whereby said exhaust gas is caused to pass in parallel streams through said jet pipe, for burning said re-heat fuel, and said annular passage and to be delivered from said jet nozzle and said annular jet nozzle.

2. A turbojet engine having an exhaust diffuser, a jet pipe spaced downstream of said exhaust diffuser, a jet nozzle at a downstream end of said jet pipe, means for supplying re-heat fuel to said jet pipe, and a casing concentrically around said jet pipe, said casing and jet pipe defining an annular passage round said jet pipe and an annular jet nozzle round said jet nozzle, in combination with a second diffuser bridging the space between said exhaust diffuser and said jet pipe, said second diffuser in the form of a sleeve having a cylindrical upstream end, said exhaust diffuser having a cylindrical downstream end, said cylindrical ends sealingly and slidably engaging each other, said second diffuser having a flared downstream end round the upstream end of said jet pipe, and said second diffuser axially slidable between a position in which its flared downstream end engages said upstream end of said jet pipe when re-heat fuel is not being supplied to said jet pipe, whereby all the exhaust gas is caused to pass through said jet pipe and be delivered from said jet nozzle, and a position in which said flared downstream end is clear of said upstream end of said jet pipe during supply of re-heat fuel, whereby said exhaust gas is caused to pass in parallel stream through said jet pipe, for burning said re-heat fuel, and said annular passage and to be delivered from said jet nozzle and said annular jet nozzle.

3. A turbojet engine having an exhaust diffuser, a jet pipe spaced downstream of said exhaust diffuser, a jet nozzle at a downstream end of said jet pipe, means for supplying re-heat fuel to said jet pipe, and a casing concentrically around said jet pipe, said casing and jet pipe defining an annular passage round said jet pipe and an annular jet nozzle round said jet nozzle, in combination with a second diffuser bridging the space between said exhaust diffuser and said jet pipe, said second diffuser having an upstream end sealingly engaged with a downstream end of said exhaust diffuser, said second diffuser having a flared downstream end round the upstream end of said jet pipe, and said second diffuser axially slidable between a position in which its flared downstream end engages said upstream end of said jet pipe when re-heat fuel is not being supplied to said jet pipe, whereby all the exhaust gas is caused to pass through said jet pipe and be delivered from said jet nozzle, and a position in which said flared downstream end is clear of said upstream end of said jet pipe during supply of re-heat fuel, whereby said exhaust gas is caused to pass in parallel streams through said jet pipe, for burning said re-heat fuel, and said annular passage and to be delivered from said jet nozzle and said annular jet nozzle, the area of said annular jet nozzle being related to the area of said jet nozzle such that when said flared downstream end is clear of the upstream end of said jet pipe the ratio of the mass flow into said annular passage to the mass flow into said jet pipe is approximately 0.617.

4. A turbojet engine having an exhaust diffuser, a jet pipe spaced downstream of said exhaust diffuser, a jet nozzle at a downstream end of said jet pipe, means for supplying re-heat fuel to said jet pipe, and a casing concentrically around said jet pipe, said casing and jet pipe defining an annular passage round said jet pipe and an annular jet nozzle round said jet nozzle, in combination with a second diffuser bridging the space between said exhaust diffuser and said jet pipe, said second diffuser having an upstream end sealingly engaged with a downstream end of said exhaust diffuser, said second diffuser having a flared downstream end round the upstream end of said jet pipe, and said second diffuser axially slidable between a position in which its flared downstream end engages said upstream end of said jet pipe when re-heat fuel is not being supplied to said jet pipe, whereby all the exhaust gas is caused to pass through said jet pipe and be delivered from said jet nozzle, and a position in which said flared downstream end is clear of said upstream end of said jet pipe during supply of re-heat fuel, whereby said exhaust gas is caused to pass in parallel streams through said jet pipe, for burning said re-heat fuel, and said annular passage and to be delivered from said jet nozzle and said annular jet nozzle, the various parts being arranged, when said flared downstream end is clear of the upstream end of said jet pipe, to provide mass flows at speeds having approximately the following Mach numbers in the case of a mass flow just downstream of said exhaust diffuser having a Mach number of X, namely: a Mach number of about 0.595X just upstream of the jet pipe, a Mach number of about 0.487X within the jet pipe just upstream of the position in which the re-heat fuel is added, and a Mach number of about 0.78X downstream of the inlet end of the annular passage and along the main length thereof.

5. A turbojet engine having an exhaust diffuser comprising external and internal casings, said external casing terminating with a cylindrical portion, a jet pipe spaced downstream of said exhaust diffuser, a jet nozzle at a downstream end of said jet pipe, the inlet end of said jet pipe formed as a diffuser so as slightly to slow down the mass flow therein, means for supplying reheat fuel to said jet pipe, and a casing concentrically around said jet pipe, said casing and jet pipe defining an annular passage round said jet pipe and an annular jet nozzle round said jet nozzle, the walls of the inlet end of said annular passage arranged so as slightly to speed-up the mass flow therein, in combination with a sleeve bridging the space between said exhaust diffuser and said jet pipe, said sleeve having an upstream end sealingly engaged with said cylindrical portion and having a flared downstream end which is arranged round the upstream end of said jet pipe and extends to near the upstream end of said further casing, said flared downstream end generally co-planar with the upstream end of said jet pipe, said sleeve slidable between a position in which its flared downstream end engages said upstream end of said jet pipe with the diffusers formed at their adjacent ends coactively engaged in series when re-heat fuel is not beng supplied to said jet pipe, whereby all the exhaust gas is caused to pass through said jet pipe and be delivered from said jet nozzle, and a position in which said flared downstream end is clear of said upstream end of said jet pipe during supply of re-heat fuel, whereby said exhaust gas is caused to pass in parallel streams through said jet pipe, for burning said re-heat fuel, and said annular passage and to be delivered from said jet nozzle and said annular jet nozzle.

References Cited in the file of this patent

UNITED STATES PATENTS

| | | |
|---|---|---|
| 2,011,420 | Samuelson | Aug. 13, 1935 |
| 2,408,099 | Sherman | Sept. 24, 1946 |
| 2,509,238 | Martin | May 30, 1950 |
| 2,516,910 | Redding | Aug. 1, 1950 |
| 2,557,883 | Miller | June 19, 1951 |
| 2,579,043 | Kallal | Dec. 18, 1951 |
| 2,585,270 | Plath | Feb. 12, 1952 |
| 2,635,420 | Jonker | Apr. 21, 1953 |
| 2,653,445 | Halford et al. | Sept. 29, 1953 |